(12) United States Patent
Fisher et al.

(10) Patent No.: US 8,036,431 B1
(45) Date of Patent: Oct. 11, 2011

(54) PORTABLE APPARATUS FOR IDENTIFICATION VERIFICATION

(75) Inventors: Barry Allan Fisher, Maple Grove, MN (US); Jack Leon Hendrickson, Carver, MN (US); Neal Joseph Gieselman, Eagan, MN (US); Anthony Ray Misslin, Chanhassen, MN (US); Michael Raymond Guzik, Fridley, MN (US); Curtis Lee Kruse, Eagan, MN (US); William Richard Cayo, Prior Lake, MN (US); David Eugene Stoltzmann, Bayport, MN (US); John J. Jancsek, Blaine, MN (US)

(73) Assignee: Identix Incorporated, Bloomington, MN (US)

( * ) Notice: Subject to any disclaimer, the term of this patent is extended or adjusted under 35 U.S.C. 154(b) by 433 days.

(21) Appl. No.: 09/698,624

(22) Filed: Oct. 27, 2000

Related U.S. Application Data

(60) Provisional application No. 60/162,592, filed on Oct. 29, 1999.

(51) Int. Cl.
*G06K 9/00* (2006.01)
(52) U.S. Cl. ......... 382/115; 382/116; 382/117; 382/118
(58) Field of Classification Search .................. 713/186; 235/380, 382, 487, 492; 356/71; 340/5.52, 340/5.53, 5.82, 5.83; 382/115, 124, 125, 382/126, 127; 283/68, 69
See application file for complete search history.

(56) References Cited

U.S. PATENT DOCUMENTS 3,619,060 A * 11/1971 Johnson .......................... 356/71
(Continued)

FOREIGN PATENT DOCUMENTS

DE 25 01 516 7/1976
(Continued)

OTHER PUBLICATIONS

Roberto J. Manzano, "Portable Scanner Will Speed Police Fingerprint Checks", Los Angeles Times, Orange County News, Apr. 17, 1998.

(Continued)

*Primary Examiner* — Sath V Perungavoor
(74) *Attorney, Agent, or Firm* — Weaver Austin Villeneuve & Sampson LLP

(57) ABSTRACT

A portable device for the live scanning of fingerprint, facial and crime scene images and the wireless transmission of said images to a central host system for identity verification. The portable device has the ability to allow the user to operate the device with a single hand. It can scan and record live fingerprint slap or roll images (via optical, solid state, or video sensors). It also includes a baffle that assists with the mechanical alignment of the fingerprints on the fingerprint sensor receiving surface and prevents bright light sources from interfering with fingerprint scans. The portable device also can scan, display, and record latent fingerprint images. It also has other data receiving and transmission functions, such as displaying and recording facial and incident scene images in conditions ranging from well lit to total darkness, recording and playing back incident scene audio information for incident description and contacting voice recordings for identification. The portable apparatus can also scan, record, and interpret magnetic stripe, smart card, or bar code information from standard and non-standard cards. It also obtains, displays, and records geographical position for incident description, mapping, and directional instruction to the user. It further provides an emergency transmission for assistance and provides a short-range wireless link to a mobile unit or a direct wireless link to the central site. It also provides for entry by the user of text data for demographics or operator use through either keyboard or voice activation.

47 Claims, 5 Drawing Sheets

Ergonomic design for single hand operation

U.S. PATENT DOCUMENTS

| | | | | |
|---|---|---|---|---|
| 3,804,524 A * | 4/1974 | Jocoy et al. | ... | 356/138 |
| 4,210,899 A * | 7/1980 | Swonger et al. | ... | 382/125 |
| 4,338,025 A * | 7/1982 | Engel | ... | 356/71 |
| 4,414,684 A * | 11/1983 | Blonder | ... | 382/127 |
| 4,516,157 A * | 5/1985 | Campbell | ... | 348/158 |
| 4,537,484 A * | 8/1985 | Fowler et al. | ... | 396/15 |
| 4,652,116 A * | 3/1987 | Rios | ... | 355/40 |
| 4,690,554 A * | 9/1987 | Froelich | ... | 356/71 |
| 4,768,088 A * | 8/1988 | Ando | ... | 348/77 |
| 4,792,226 A * | 12/1988 | Fishbine et al. | ... | 356/71 |
| 4,811,414 A * | 3/1989 | Fishbine et al. | ... | 382/272 |
| 4,835,372 A * | 5/1989 | Gombrich et al. | ... | 235/375 |
| 4,843,377 A * | 6/1989 | Fuller et al. | ... | 340/573.4 |
| 4,866,764 A * | 9/1989 | Barker, III | ... | 379/355.01 |
| 4,896,363 A * | 1/1990 | Taylor et al. | ... | 382/125 |
| 4,917,987 A * | 4/1990 | Arndt et al. | ... | 430/139 |
| 4,933,976 A * | 6/1990 | Fishbine et al. | ... | 382/127 |
| 4,955,038 A * | 9/1990 | Lee et al. | ... | 375/256 |
| 4,993,068 A * | 2/1991 | Piosenka et al. | ... | 713/186 |
| 4,995,086 A * | 2/1991 | Lilley et al. | ... | 382/124 |
| 5,034,615 A * | 7/1991 | Rios et al. | ... | 250/461.1 |
| 5,078,426 A * | 1/1992 | Reardon | ... | 283/78 |
| D325,196 S * | 4/1992 | Stanger et al. | ... | D14/384 |
| 5,148,477 A * | 9/1992 | Neely et al. | ... | 382/107 |
| 5,177,802 A * | 1/1993 | Fujimoto et al. | ... | 382/124 |
| 5,210,797 A * | 5/1993 | Usui et al. | ... | 382/126 |
| 5,222,152 A * | 6/1993 | Fishbine et al. | ... | 382/127 |
| 5,230,025 A * | 7/1993 | Fishbine et al. | ... | 382/127 |
| 5,249,370 A * | 10/1993 | Stanger et al. | ... | 34/443 |
| D346,158 S * | 4/1994 | Stanger et al. | ... | D14/384 |
| D348,445 S * | 7/1994 | Fishbine et al. | ... | D14/384 |
| D351,144 S * | 10/1994 | Fishbine et al. | ... | D14/384 |
| 5,363,453 A * | 11/1994 | Gagne et al. | ... | 382/125 |
| 5,448,659 A * | 9/1995 | Tsutsui et al. | ... | 385/14 |
| 5,467,403 A * | 11/1995 | Fishbine et al. | ... | 382/116 |
| 5,583,933 A * | 12/1996 | Mark | ... | 379/357.04 |
| 5,601,867 A * | 2/1997 | Riedl et al. | ... | 427/1 |
| 5,613,012 A * | 3/1997 | Hoffman et al. | ... | 382/115 |
| 5,623,553 A * | 4/1997 | Sekiya | ... | 382/127 |
| D389,723 S * | 1/1998 | Godard et al. | ... | D8/320 |
| 5,732,148 A * | 3/1998 | Keagy et al. | ... | 382/124 |
| 5,748,765 A * | 5/1998 | Takhar | ... | 382/124 |
| 5,770,849 A * | 6/1998 | Novis et al. | ... | 235/492 |
| 5,805,745 A * | 9/1998 | Graf | ... | 382/291 |
| 5,825,474 A * | 10/1998 | Maase | ... | 356/71 |
| 5,858,915 A * | 1/1999 | Chikami | ... | 503/206 |
| 5,889,474 A * | 3/1999 | LaDue | ... | 340/825.49 |
| 5,942,761 A * | 8/1999 | Tuli | ... | 250/556 |
| 5,984,366 A * | 11/1999 | Priddy | ... | 283/72 |
| 5,995,630 A * | 11/1999 | Borza | ... | 380/54 |
| 6,011,860 A * | 1/2000 | Fujieda et al. | ... | 382/126 |
| 6,012,636 A * | 1/2000 | Smith | ... | 235/380 |
| 6,018,739 A * | 1/2000 | McCoy et al. | ... | 1/1 |
| 6,038,332 A * | 3/2000 | Fishbine et al. | ... | 382/115 |
| 6,040,783 A * | 3/2000 | Houvener et al. | ... | 340/5.53 |
| 6,085,976 A * | 7/2000 | Sehr | ... | 235/384 |
| 6,088,585 A * | 7/2000 | Schmitt et al. | ... | 455/411 |
| 6,104,809 A * | 8/2000 | Berson et al. | ... | 713/186 |
| 6,111,977 A * | 8/2000 | Scott et al. | ... | 382/124 |
| 6,122,394 A * | 9/2000 | Neukermans et al. | ... | 382/124 |
| 6,134,340 A * | 10/2000 | Hsu et al. | ... | 382/124 |
| 6,141,436 A * | 10/2000 | Srey et al. | ... | 382/124 |
| 6,177,950 B1 * | 1/2001 | Robb | ... | 348/14.01 |
| 6,185,319 B1 * | 2/2001 | Fujiwara | ... | 382/127 |
| 6,298,230 B1 * | 10/2001 | Schneider-Hufschmidt | . | 455/411 |
| 6,307,956 B1 * | 10/2001 | Black | ... | 382/124 |
| 6,314,196 B1 * | 11/2001 | Yamaguchi et al. | ... | 382/125 |
| 6,317,544 B1 * | 11/2001 | Diehl et al. | ... | 385/115 |
| 6,320,974 B1 * | 11/2001 | Glaze et al. | ... | 382/115 |
| 6,341,171 B1 * | 1/2002 | de Lanauze | ... | 382/124 |
| 6,389,290 B1 * | 5/2002 | Kikinis et al. | ... | 455/456.5 |
| 6,400,836 B2 * | 6/2002 | Senior | ... | 382/124 |
| 6,424,845 B1 * | 7/2002 | Emmoft et al. | ... | 455/575.1 |
| 6,434,403 B1 * | 8/2002 | Ausems et al. | ... | 455/556.2 |
| 6,484,260 B1 * | 11/2002 | Scott et al. | ... | 713/186 |
| 6,496,630 B2 * | 12/2002 | Iwai et al. | ... | 385/120 |
| 6,518,881 B2 * | 2/2003 | Monroe | ... | 340/539.1 |
| 6,526,335 B1 * | 2/2003 | Treyz et al. | ... | 701/1 |
| 6,552,682 B1 * | 4/2003 | Fan | ... | 342/357.09 |
| 6,560,741 B1 * | 5/2003 | Gerety et al. | ... | 714/752 |
| 6,592,031 B1 * | 7/2003 | Klatt | ... | 235/382 |
| 6,631,201 B1 * | 10/2003 | Dickinson et al. | ... | 382/124 |
| 6,657,538 B1 * | 12/2003 | Ritter | ... | 340/5.81 |
| 6,668,071 B1 * | 12/2003 | Minkin et al. | ... | 382/124 |
| 6,715,679 B1 * | 4/2004 | Infosino | ... | 235/449 |
| 6,719,200 B1 * | 4/2004 | Wiebe | ... | 235/382 |
| 6,744,910 B1 * | 6/2004 | McClurg et al. | ... | 382/124 |
| 6,747,561 B1 * | 6/2004 | Reeves | ... | 340/573.1 |
| 6,762,684 B1 * | 7/2004 | Camhi | ... | 340/573.1 |
| 6,886,104 B1 * | 4/2005 | McClurg et al. | ... | 713/300 |
| 6,898,301 B2 * | 5/2005 | Iwanaga | ... | 382/124 |
| 7,073,711 B2 * | 7/2006 | Fernandez et al. | ... | 235/382 |
| 7,128,265 B2 * | 10/2006 | Silverbrook et al. | ... | 235/462.08 |
| 7,556,203 B2 * | 7/2009 | Robinson et al. | ... | 235/462.45 |
| 2001/0013546 A1* | 8/2001 | Ross | ... | 235/382 |
| 2001/0030644 A1* | 10/2001 | Allport | ... | 345/173 |
| 2001/0045458 A1* | 11/2001 | Polansky | ... | 235/382 |
| 2002/0021827 A1* | 2/2002 | Smith | ... | 382/124 |
| 2002/0036565 A1 | 3/2002 | Monroe | | |
| 2003/0161507 A1* | 8/2003 | Lawandy | ... | 382/118 |
| 2004/0016811 A1* | 1/2004 | Fernandez et al. | ... | 235/462.01 |
| 2004/0046027 A1* | 3/2004 | Leone et al. | ... | 235/462.13 |
| 2004/0052405 A1* | 3/2004 | Walfridsson | ... | 382/115 |
| 2006/0013447 A1* | 1/2006 | Siegel et al. | ... | 382/115 |
| 2006/0018519 A1* | 1/2006 | Siegel et al. | ... | 382/116 |

FOREIGN PATENT DOCUMENTS

| | | |
|---|---|---|
| JP | 10240906 A * | 9/1998 |
| WO | WO 9422371 A2 * | 10/1994 |
| WO | WO 9617480 A2 * | 6/1996 |

OTHER PUBLICATIONS

Morpho DigiScan Cellular Product Overview, "Fast, Accurate, And Reliable Identification You Can Take With"Sagem Morpho, Inc., Nov. 6, 1998.
Printrak International Inc. Press Release "Printrack International Announces New Portable Fingerprint ID Solution", Dec. 10, 1996.
Printrak ID Solutions brochure on Printrak's SFS 2000™, 2 pages.

* cited by examiner

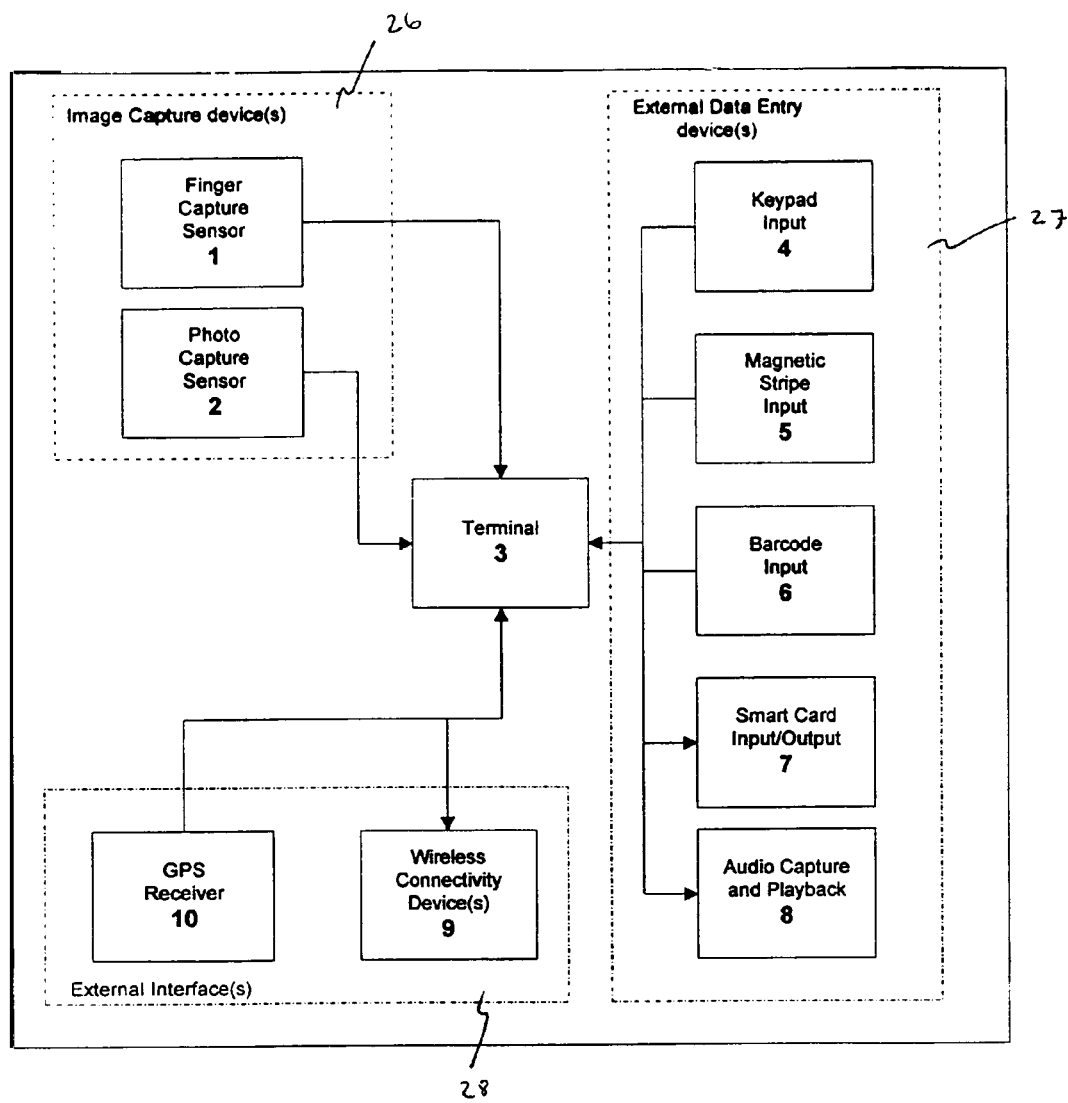
Figure 1. Component Block Diagram

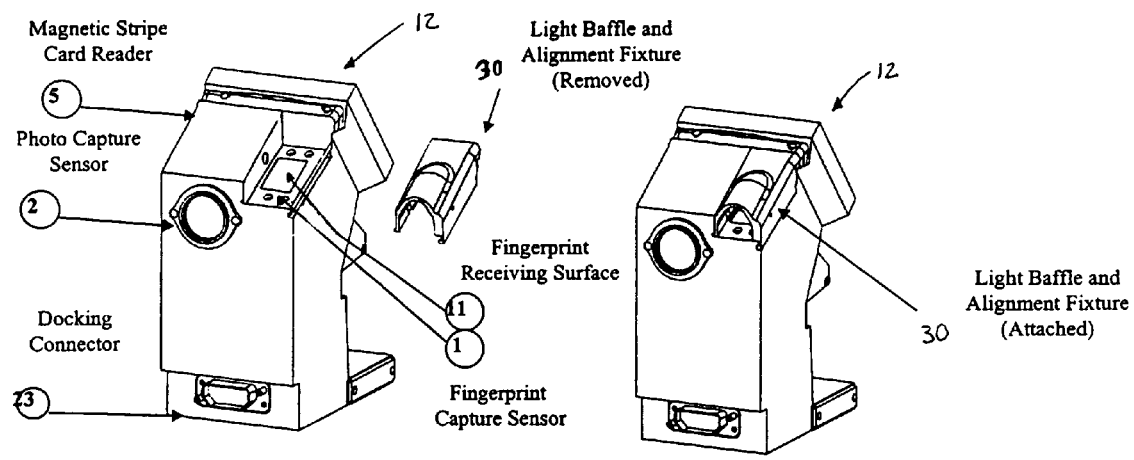
Figure 2A Removable Light Baffle
Figure 2B
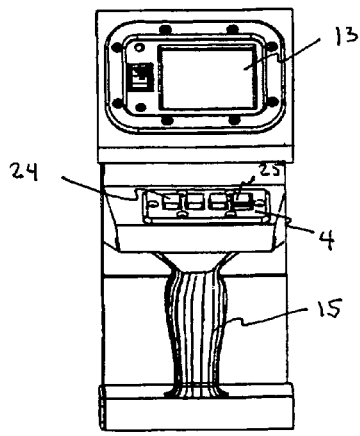
Figure 3: Ergonomic design for single hand operation

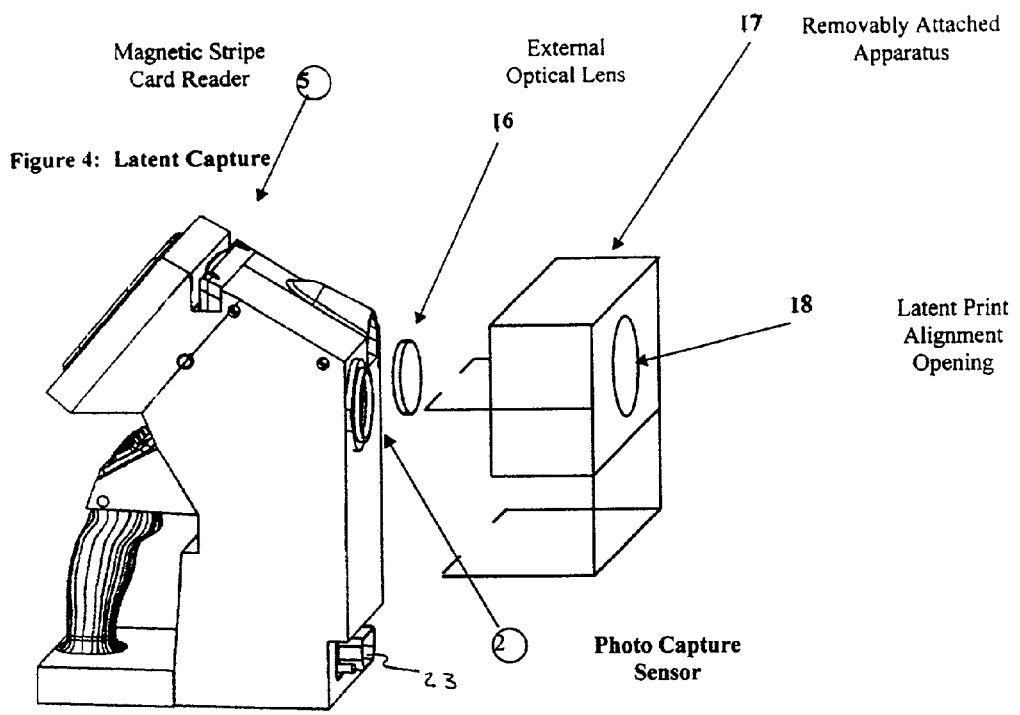
Figure 4: Latent Capture Fixture; Magnetic Stripe Card Reader
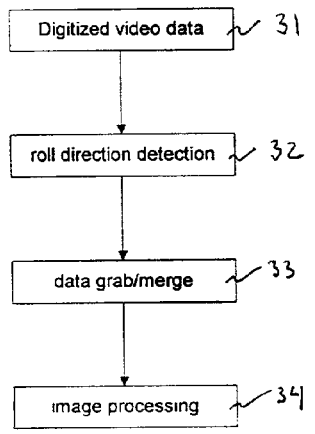
Figure 5: Data flow for roll fingerprint capture

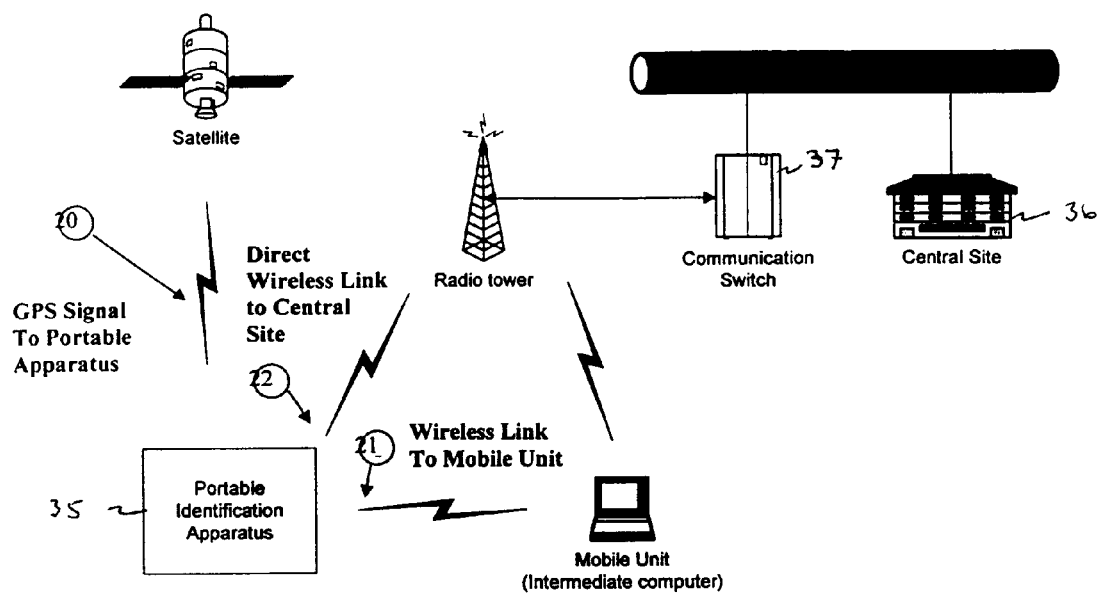
Figure 6: Wireless Links to the apparatus

PORTABLE APPARATUS FOR IDENTIFICATION VERIFICATION

RELATED APPLICATIONS

This application claims the benefit of provisional application, U.S. Ser. No. 60/162,592, filed on Oct. 29, 1999, entitled "PORTABLE APPARATUS FOR IDENTIFICATION VERIFICATION", by Fisher et al.

TECHNICAL FIELD

The present invention relates to apparatus for the live scanning of fingerprint, facial and crime scene images and more particularly to a portable apparatus for the scanning and capture of fingerprint, facial and crime scene images and the wireless transmission of said images to a central location for identity verification.

BACKGROUND OF THE INVENTION

Over the years, the most commonly used techniques for both identity verification and the identification of potential crime suspects have been the use of fingerprints and photographs or "mug shots".

Originally, fingerprinting was done by inking a suspect's finger and applying the inked finger to paper. As can be readily understood, fingerprint information in this form was difficult to use. Making a fingerprint match was an extremely time-consuming task. Digital technology significantly advanced the art of fingerprinting. Inked images could be scanned, the image digitized and recorded in a manner that could later be searched in a reasonably expeditious manner by computer. Problems arose, however, due to the quality of inked images. Over- and under-inking resulted in blurred or vague images, thus rendering the digitized information useless. Further, the process of scanning an inked image was relatively time-consuming.

These and other problems led to "live scanning". According to live scanning techniques, the fingerprint of a suspect is scanned directly from the suspect's finger, as opposed to being scanned from an inked image of the print. More specifically, live scans are those procedures that capture fingerprint ridge detail in a manner which allows for the immediate processing of the fingerprint image with a computer. Original work in the field dates back to original patents filed in 1964 concerning techniques used to capture high contrast images of fingerprints for photographic or digital captures of fingerprints.

Since their introduction, live scans have become an important tool for law enforcement. The live scan has the potential to overcome inherent weaknesses in the ink capture of fingerprints and provide immediate transmission of fingerprint images; and allow for image enhancement if necessary.

These characteristics provide law enforcement with the ability to improve the quality of the fingerprint database, thereby improving the likelihood that identifications may be made either from latent fingerprints or from identity verification checks. In addition, live scan fingerprints are easily adaptable to computerized storage and processing techniques, increasing cooperation and fingerprint data transfer between various police agencies.

Systems, which optically, or optically and mechanically, generate fingerprint images have been in use for quite some time. Several such fingerprinting systems are disclosed in Fishbine et al., U.S. Pat. Nos. 4,811,414 and 4,933,976; Ruell German Patent No. 3423886 A1; Becker U.S. Pat. No. 3,482,498; McMahon U.S. Pat. No. 3,975,711; Schiller U.S. Pat. Nos. 4,544,267 and 4,322,163; Marcus U.S. Pat. No. 4,533,837 and White U.S. Pat. No. 3,200,704. However, the problem with all of these systems is that they are only capable of providing optical or optical and mechanical fingerprint images at a central location such as the police station.

U.S. Pat. No. 5,122,152 to Fishbine et al. solved this problem by providing a portable and lightweight fingerprint scanning system which can optically generate fingerprint images. This system is ideal for traffic officers and other law enforcement professionals who want to perform immediate identity and background checks on individuals while in the field. The system described in Fishbine et al, U.S. Pat. No. 5,122,152, uses the optical principle of total internal reflection. When a finger is positioned on a finger-receiving surface, an optical image of the ridge and valley pattern on the surface of the finger (i.e., the fingerprint) is propagated from the finger-receiving surface.

The finger-receiving surface is a prism with illumination provided on side surfaces by an illumination source that consists of light-emitting diodes attached to the side surfaces of the prism. The bottom surface of the prism is coated with an opaque material such as black paint. The prism is designed to utilize the optical principle of frustration of total internal reflection as described in Fishbine et al. U.S. Pat. No. 4,811,414. These properties result in a visual fingerprint image of a finger placed on the finger-receiving surface with "light" areas corresponding to ridges of the fingerprint and "dark" areas corresponding to valleys of the fingerprint. The image is captured using a video camera and the data is digitized for display, storage, and transmission. Optical fingerprint sensors, as described in the reference patent, require complex optical path corrections. Video cameras, prisms, lenses, and mirrors used in the system must be precisely located.

An investigator at an incident scene is often at risk due to lack of information. If a suspect or witness feels the investigator will obtain information that will incriminate them, the risk to the investigator is increased. In these situations, investigator safety is increased if the portable device for capturing images may be operated using a single hand. Although mobile, the system described in Fishbine et al, U.S. Pat. No. 5,222,152, does not allow for single handed operation. Single handed operation means the ability to hold the device in one hand and use the same hand to control the device while conducting an investigation. The portable system described in Fishbine et al, U.S. Pat. No. 5,222,152, required the officer to use both hands, holding the device in one hand while using the other hand to capture images or enter text. In capturing images, the operator holds the device in one hand and is required to align the suspect's finger in the correct position to capture a usable print. There is a need for a system that allows for single hand operation and image gathering. This would provide a law enforcement officer with additional safety by having one hand free to protect oneself from potential harm that may be inflicted by a suspect.

The orientation and location of a captured fingerprint significantly impacts the quality of the response received from the search system. It is important to align the finger along the capture surface properly, capture the core of the print, and prevent movement by the witness or suspect as the print is being captured. It is desirable for the system to orient and align the finger without requiring the officer to use both hands.

Any optical fingerprint system is susceptible to intense ambient lighting. Intense ambient light which strikes the fingerprint receiving surface produces bright images on the video camera which captures the fingerprint image. If the ambient light intensity is equivalent to the light source of the fingerprint capture system, the bright spots will interfere with the fingerprint image being captured. Thus, when the finger-receiving surface on the system disclosed in Fishbine et al, U.S. Pat. No. 5,222,152, was exposed directly to ambient lighting, the operator was required to reorient the device to eliminate interference from the bright ambient lighting. During an investigation, these extra actions are undesirable.

SUMMARY OF THE INVENTION

In accordance with the present invention, the above and other problems are solved by providing the present invention which is a portable and lightweight fingerprint scanning apparatus that can optically scan and record fingerprint images in the field and transmit said images to a wireless mobile unit for processing and subsequent wireless transmission to a central location for the purpose of providing immediate identity and background checks on individuals being fingerprinted in the field. The apparatus of the present invention includes a fingerprint scanner and a wireless transmitter to transmit the fingerprint image to a mobile unit. In the preferred embodiment the present invention also provides for the capability of using a video camera to capture a photographic image or "mug shot" for wireless transmission to a mobile unit. An embodiment of the present invention also provides the ability to preview the fingerprint and "mug shot" images on a video monitor and to control transmission and processing of the fingerprint and "mug shot" images by the mobile unit using a terminal processor or keypad located on the portable fingerprint scanning apparatus. In the present embodiment, the terminal processor within the portable device may be a Pentium processor. The present invention allows law enforcement professionals to perform immediate identity and background checks on an individual while in the field.

The utility of the present invention is that it may be operated singled handedly, and, it eliminates the problems caused by direct exposure of the finger-receiving surface to bright ambient lighting. This portable apparatus may also use solid state fingerprint sensors that eliminate the need for precise locations of components, thus increasing reliability of the sensor over the life of the apparatus. Solid state sensors are also less sensitive to wet or dry fingerprints. The system also provides a mechanical means of providing both finger alignment and core position location thereby reducing the workload of the investigator while capturing a fingerprint. This reduction in workload improves investigator safety by allowing closer monitoring of the person being fingerprinted. The system also provides for the capture of "latent fingerprints" at the scene of a crime. The ability to search and capture "latent fingerprints" with a portable device reduces investigation time.

These and various other features as well as advantages, which characterize the present invention, will be apparent from a reading of the following detailed description and a review of the associated drawings.

BRIEF DESCRIPTION OF THE DRAWINGS

FIG. 1 illustrates a hardware component block diagram of the portable identification verification system;

FIGS. 2A-2B illustrates perspective views of the present portable device, showing a light baffle attached and removed;

FIG. 3 illustrates perspective views of the present portable device, showing the ergonomic design of the single hand operation handle;

FIG. 4 illustrates a side view of the present portable device, showing the magnetic stripe and smart card reader and removably attached latent print alignment guide;

FIG. 5 is a flow diagram illustrating a flow diagram for a rolled fingerprint capture; and FIG. 6 is a communication flow diagram illustrating the communication of information between the portable device and various system to which the portable device connects.

SYSTEM OVERVIEW

Figure 7:
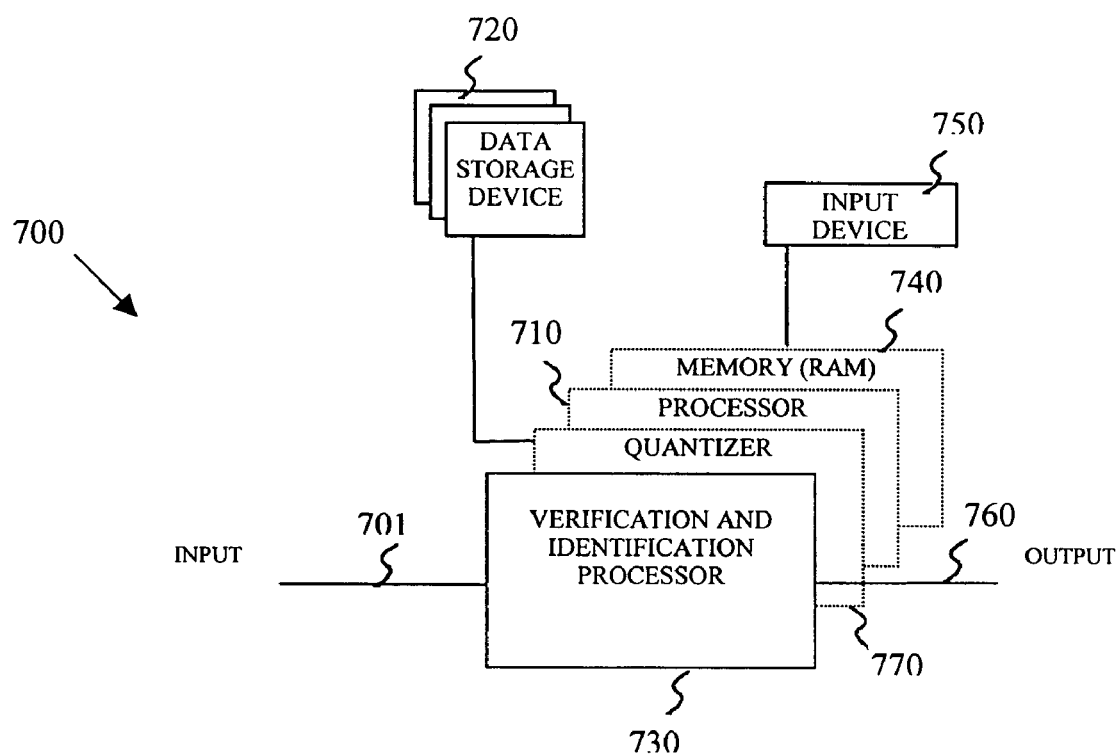
FIG. 7 is an exemplary hardware environment for one embodiment of the present invention.

The present invention comprises a portable apparatus for identification and verification with the ability to transmit, in real-time, data captured in the field to a central site for processing and subsequent return and display. The portable apparatus has the ability to allow the user to operate the device with a single hand. It may scan and record live fingerprint slap or roll images (via optical, solid state, or video sensors), and prevent bright light sources from interfering with fingerprint scans. It also includes a baffle that assists with the mechanical alignment of the fingerprints on the fingerprint sensor receiving surface. The portable device also may scan, display, and record latent fingerprint images. It also has other data receiving and transmission functions, such as displaying and recording facial and incident scene images in conditions ranging from well lit to total darkness. In addition, it provides for recording and play back of incident scene audio information for incident description and voice recordings of contacts for identification. The portable apparatus may also scan, record, and interpret magnetic stripe, smart card, or bar code information from standard and non-standard cards. It also obtains, displays, and records geographical position for incident description, mapping, and directional instruction to the user. It further provides an emergency transmission for assistance and provides a short-range wireless link to a mobile unit or a direct wireless link to the central site. It also provides for user entry of text data for demographics or operator use through either keyboard or voice activation.

When operating at an incident scene, data capture and management are the keys to being able to integrate all information. Multiple methods of data entry may be required in order to enter incident scene descriptions or information on a portable unit. The ability to enter text, dictate descriptions for recording, and scan information from bar codes, magnetic stripes, or smart cards, enables the investigator to retain and organize incident scene information directly with the identification information. This will give investigators the capability to conduct complex searches against multiple incidents.

In addition to textual or scanned data, the ability to geographically identify the location of site evidence automatically would increase the investigator's ability to reconstruct incident scenes in great detail. Automatic detection of geographical position also allows the investigator to use advanced mapping programs that identify surrounding areas, giving the investigator additional information about the incident site. The same mapping function would also allow coordination and direction between different investigative teams or personnel. The automated detection of geographical position may be obtained using the global positioning system (GPS).

Investigators often are required to work in an area which potentially contains risk to the investigator. Suspects or witnesses are more likely to use physical violence if they feel the investigator has access to information that could incriminate them. It is desirable for the investigator to be able to send a message requesting assistance by using a single button; transmitting an "officer needs assistance" message to the central site. The expeditious use of this function could be the difference between life and death for an investigator in a violent situation.

Wireless transmittal of data to a central site provides expedient flow of information. The prior invention transmits data a short distance to a mobile unit that in turn relayed the information to the central site via existing law enforcement networks. The ability to directly link information to a central site, eliminating the need for a mobile unit as intermediary, gives the investigator increased flexibility, reliability and reduces transmission delays.

DETAILED DESCRIPTION OF THE INVENTION

In the following detailed description of the preferred embodiments reference is made to the accompanying drawings that form a part hereof, and is shown by way of illustration specific embodiments in which the invention may be practiced. It is to be understood that the other embodiments may be utilized and structural changes may be made without departing from the scope of the present invention.

FIG. 1 illustrates a hardware component block diagram of the portable identification verification system in accordance with the present invention. The major components of the portable identification verification system include image capture devices 26, external data entry devices 27, external interfaces 28, and a terminal 3. The terminal 3 controls the various functions of the portable fingerprinting apparatus. The image capture devices 26 include an optical fingerprint sensor 1 and photo capture sensor 2. These sensors are used to detect and capture an image of a fingerprint. The external data entry devices 27 include a keypad input 4, magnetic stripe input 5, a barcode input 6, smart card input/output, 7 and audio capture and playback 8. These components allow rapid verification of evidence by transmitting the information via external interfaces 28. The external interfaces 28 include a GPS receiver 10 and wireless connectivity devices 9. These subcomponents will be explained in detail hereafter.

The embodiment of the system shown in FIGS. 2A and 2B illustrates the incorporation of a removable light baffle that prevents excessive ambient light from interfering with the fingerprint scan. FIG. 2A illustrates a light baffle 30 removed from the fingerprint receiving surface 11 and FIG. 2B shows when the baffle 30 is mounted on the apparatus 12. The baffle mounting mechanism also aligns the fingerprint within the finger-receiving surface such that the fingerprint characteristics of interest are properly located with respect to the fingerprint capture sensor 1. The finger to be printed is inserted into the baffle 30 and slid forward against the baffle mounting mechanism. The front end of the finger is thus located such that the core of the fingerprint is within the central region of the fingerprint-receiving surface 11. The sides of the baffle mounting mechanism provide a channel that aligns the finger with the fingerprint-receiving surface 11 and minimizes the ability to rotate the finger during the fingerprint capture. The baffle 30 itself is removable for operation when ambient lighting does not require the baffle or when alignment and rotation mechanisms are not required, e.g., during roll fingerprint captures.

During the capture of a fingerprint it is desirable to position the core of the fingerprint over the center portion of the fingerprint-receiving surface 11. The core is the portion of the fingerprint that contains the most information, or minutiae used by automated fingerprint identification systems (AFIS).

It also improves AFIS performance if the fingerprint is aligned with the fingerprint-receiving surface 11 such that the fingerprint image is not rotated when captured. An apparatus such as a light baffle 30, that provides both finger alignment and core position location will reduce the workload of the investigator while capturing a fingerprint. This reduction in workload improves investigator safety by allowing closer monitoring of the person being fingerprinted.

The requirement to capture good quality images will be initiated by the physical finger guides and finger positional aids. After an image is captured, the images are processed by image quality control (IQC) algorithms to judge the quality of the image in regards to whether the image is light, dark, or too small. These algorithms may be applied to both rolled and flat fingerprint images.

The image quality algorithms process finger print images as follows. Assume an image of width $W_T$ by height $H_T$ pixels is captured by the fingerprint capture sensor 1. The image is broken down into smaller rectangular regions ($R_1 \ldots R_N$) of width $W_R$ by height $H_R$ pixels. The size of these smaller rectangles is tuned to the particular image capture device. The region size is chosen to fit uniformly within the captured image. The captured image may then be treated as a number of rectangles $R_N$. For each region $R_1 \ldots R_N$, the pixels in the rectangle are then analyzed. The value of each pixel is compared to a dark and light threshold value $P_{dark}$ and $P_{light}$. These dark and light threshold values are tuned to the particular image capture device. A count is kept of the number of dark and light pixels within each region. Each region $R_1 \ldots R_N$, is then counted as dark, light, or both by comparing the number of dark or light pixels against another set of threshold values $P_{darkent}$ and $P_{lightent}$. These dark and light threshold values are also tuned to the particular image capture device. A count is kept of the number of dark and light regions within the total number of regions.

The image is then evaluated as dark, light, or both by comparing the number of dark or light regions against a threshold value $P_{darkpet}$ and $P_{lightpet}$. These numbers are expressed as percentages of dark or light regions as compared to the total number of regions. These dark and light threshold values are also tuned to the particular image capture device. The extent of each row and column of regions that is not light is determined. Based upon the largest aid smallest region extent in both the horizontal and vertical directions, the size of the image is determined. The extent of the image height and width are compared to threshold values $H_I$ and $W_I$ to determine if the image is small. These threshold values are tuned to the particular image capture device. Using the light, dark, and small determinations, a message is presented to the user that the image is acceptable or should be retaken.

The present embodiment of the system also incorporates processing algorithms that allow the capture of a roll fingerprint (as described in FIG. 5). Incorporating the ability to "roll" the fingerprint as done in central site live scan systems may enhance the fingerprint image described in the referenced disclosure. In capturing a roll fingerprint the left edge of the finger is placed on the left end of the fingerprint-receiving surface 11. The finger is then rolled from left to right on the receiving surface 11. The image recording device tracks the finger image as it rolls across the receiving surface 11 and records only a concatenated image of the fingerprint in contact with the receiving surface 11. Since more area of the fingerprint is recorded, the roll fingerprint provides increased data for comparison by automated fingerprint identification systems to fingerprint databases.

FIG. 3 illustrates a perspective view of the present portable device showing the present invention ergonomic design of the handle for single hand operation. The current embodiment implements a packaging approach with an ergonomic grip that allows the user to hold the device with either hand. The grip is tapered and formed to allow the user a comfortable hold on the grip while the thumb and forefinger are free to operate the controls of the apparatus. The controls are implemented such that the user may operate switches on a keypad, using the thumb or forefinger of either hand, to step through the functionality of the device. FIG. 3 illustrates the current physical embodiment of the portable device, showing an embodiment of the ergonomic grip 15 and a keypad 4. The keypad 4 is located with three primary switches 24 centered within easy reach of the operator's thumb. The user is able to control software functionality using menus shown on the display 13 and the three primary switches. The fourth switch 25, which in the present embodiment is an ASSIST switch, is protected by a bezel and located farthest from the center of the grip 15 to prevent inadvertent operation.

The current embodiment of the apparatus also includes an "Assistance" function that generates an emergency message that is transmitted to the central site. The investigator presses a dedicated button, the ASSIST switch 25, that is interpreted by the software. The investigator is asked to confirm the transmission by pressing "yes" and the message is then sent to the central site via the wireless transmission method employed. The assistance request will be done silently without indicating to other parties of the activation. The interpretation and distribution of the request may be customized to the operating environment of the hand-held unit.

FIG. 4 illustrates a side view of the present portable device, showing the magnetic stripe and smart card reader and removably attached latent print alignment guide according to the present invention. The photo capture sensor 2 for capture of facial and incident scene images included in the current embodiment of the apparatus includes high magnification optics. When combined with a removable apparatus 17 the photo capture sensor may be used to obtain latent fingerprint images that approach law enforcement fingerprint image quality specifications. The removable apparatus will provide a mechanism for limiting ambient light from hitting the latent fingerprint and will provide a variable illumination source with level controls. The lighting source in the current embodiment is made up of CCFL fluorescent lights with opal glass diffusers. Future embodiments could include, but are not limited to, LED, ultraviolet, or incandescent light sources. In addition to lighting control, the removable apparatus may provide external optics 16 for optical corrections to the fingerprint image. The alignment opening 18 on the front of the removable attached apparatus is placed over the latent fingerprint and the latent search option is commanded from the user interface. The terminal then sets the optical magnification of the photo capture sensor to scale the spacing of the fingerprint image pixels to 500 dots per inch. The lighting level is adjusted to optimize the fingerprint image. This image is then captured for display, recording, or wireless transmittal to the central site. The apparatus includes the ability to isolate the fingerprint within the captured image and enhance the fingerprint image prior to transmittal or recording. Enhancements include, but are not limited to, thresholding, automated contrast enhancement, sharpness enhancement, or image inversion. This image is then used to conduct short duration searches on an automated fingerprint identification system using the incident scene latent fingerprint(s).

The photo capture sensor 2 in the current invention has the ability to capture photo images even in complete darkness. The sensor incorporates infrared LEDs as an illumination source. The photo capture sensor is capable of capturing black and white photo images using this illumination. In the current embodiment the device uses a video camera, such as a Sony video camera-model number FCB-EX470L, with integrated infrared LEDs. An alternate configuration could include a single board camera such as the Edmund Scientific high resolution monochrome micro camera, model number J53-307, along with standalone infrared LEDs and external lens magnification for latent capture.

Incident scenes are not always well lit. Traditional cameras using a flash system provide only a momentary improvement in lighting. They do not allow the operator to view the incident scene under the same lighting that the image will be captured. The ability to operate under an infrared source and display live video allows the operator to preview the images about to be recorded. The infrared source also overcomes lighting limitations and improves image quality. In the extreme condition that no light is available at the incident scene the combination of infrared light source and live video display gives the investigator a limited night sight capability.

The current embodiment of the system incorporates audio capture 8 via a far field microphone and digital audio chip set which will enable digital recording, voice recognition applications and speech recognition. The current embodiment of the system incorporates a sound card such as a Sound-Blaster® compatible PC104 circuit card or an ADTECH PC104-3210. Future embodiments may incorporate Sound-Blaster compatible chipsets, such as the Analog Devices AD1816 or Aureal Vortex 2. From the teachings provided herein, those skilled in the art appreciate that the foregoing description sets forth one embodiment of a soundcard, although other object circuit cards are possible.

Digital recordings may also be captured, stored, and transmitted to central sites to enable complete descriptions and demographic information to be filed along with incident reports. Digital recordings of incident scene witnesses or suspects may be retained for later analysis and identification purposes. Speech recognition will enable voice-activated control of the apparatus. The audio range of the device may be from about 200 to 3700 Hz. Sampling may be accomplished at approximately 7400 Hz or greater to insure sufficient frequency resolution for post processing algorithms at central sites.

The system further includes a text entry device. In the current embodiment, the text entry device includes a keypad 4 and rotary dial. In addition, the system includes a magnetic card reader 5 that is attached to a dedicated RS-232 interface that allows the investigator to scan data directly from drivers' licenses, credit cards, or other forms of cards using magnetic stripes into the apparatus. An alternative embodiment could implement a bar code reader 6 in place of the magnetic card reader. In an alternative embodiment of the apparatus, a combined magnetic stripe and smart card reader 7 may be implemented in place of the magnetic stripe reader. The data from the magnetic stripe, smart card, or bar code reader may then be captured, stored, and transmitted wirelessly along with other information from the incident. The magnetic card reader 4, bar code reader 6, and smart card reader 7, are commercially available.

As illustrated in FIGS. 2 and 4, the apparatus includes both a docking connector 23 for direct link to a mobile unit in a squad car and a wireless connectivity device (see FIG. 1) via an RF link from the apparatus to the mobile unit in a squad car as shown in FIG. 6. This RF link may be a 2.4 GHz spread spectrum receiver/transmitter that provides a serial data stream to the mobile unit. The communication link may be a serial port, such as an RS-232 serial port, on the mobile unit in the squad car. In a preferred embodiment of the apparatus a data link from the apparatus to the mobile unit in the car may use a PCM/CIA port on the mobile unit to provide a 2.4 GHz spread spectrum signal capable of over 2.0 megabits/second communication. An alternative configuration providing lower cost may transmit data vis a 900 Mhz signal with data rates from about 19.2 kilobits/second to 115 kilobits/second. Both 2.4 GHz and 900 MHz are considered free frequency bands where general purpose communication may be accomplished. The specification of these frequencies provides for lower cost of hardware. However, embodiments of the apparatus could include other frequencies and data rates as specified by the operating agency.

FIG. 5 is a flow diagram illustrating a flow diagram for a rolled fingerprint capture according to the present invention. A rolled fingerprint image is generated and captured by the portable device through merging multiple frames of the camera data stream. A frame in this context is the digitized stream 31 of data produced from the fingerprint imaging sensor that comprises a complete field of view for the sensor. The direction in which the roll is proceeding 32 is determined for the purpose of reducing data processing requirements on the system and also to provide user feedback relating to the progress of the roll image grab 33. As the finger is rolled across the fingerprint-receiving surface only a portion of the image contains fingerprint data. In knowing the direction the roll is proceeding, it is possible to predict the portion of the entire image which contains fingerprint data. This portion may then be processed 34 instead of the entire image. The result is a portable fingerprint capture device with the ability to capture, display, record, and transmit roll fingerprints to a central site for identification verification. An additional method of processing rolled fingerprints is disclosed in U.S. Pat. No. 4,933,976, which is assigned to Digital Biometrics, Inc., is incorporated herein by reference as if fully set forth herein.

In one embodiment of the portable device, a solid state sensor is used in place of an optical fingerprint sensor 1. Solid state sensors are manufactured using semiconductor technology to integrate a sensor and the associated electronics on a single integrated circuit. The solid state sensor mechanism may be based on capacitive, impedance, acoustic, laser or polymer concepts. The integrated circuit is laid out such that the sensor mechanism is replicated in 0.02" spacing (500 sensors per inch) in both the horizontal and vertical direction. The solid state sensor is incorporated in the portable identification verification apparatus via communications buses to the terminal 3. These buses may be serial (RS-232, USB, or other advanced serial buses), parallel, or networked communications buses. The communication bus must be capable of obtaining images at a sufficient number of frames per second to meet the requirements for roll prints previously specified. In order to meet law enforcement minimum requirements, the preferred sensor will have a surface area of approximately 1"×1". A solid state sensor will provide improved reliability and reduced cost and weight over an optical sensor.

FIG. 6 is a communication flow diagram illustrating the communication of information between the portable device and various systems to which the portable device connects according to the present invention. Another alternative configuration would eliminate all links to the mobile unit by providing a wireless link 22 from the apparatus 35 directly to the central site 36 via a communication switch 37 as shown in FIG. 6. The wireless format could be cellular (Cellular Digital Packet Data (CDPD), Mobitex, PCS, or other cellular service) or an RF network currently available in an area where the apparatus will be used. The types of coverage would be obtained by contacting local wireless service providers. The direct wireless link 22 is implemented via a PCM/CIA card such as the Novatel Merlin wireless modem.

The current embodiment of the apparatus includes interfaces to incorporate Global Positioning System, or GPS, satellite access 20 (as shown in FIG. 6) in the device. The current GPS interface may be accomplished via a dedicated RS-232 serial channel that communicates with available commercial GPS location sensors, such as the Global American GE7986 GPC receiver, in a PC104 form factor. Alternative configurations could interface with commercial GPS sensors using PCM/CIA interfaces such as the Premier Electronics Marco Polo GPS system. Future embodiments may directly incorporate GPS chipsets, such as the Rockwell 5-Channel GPS receiver. The GPS system may provide the user geographical location information within 25 meters. Advanced embodiments of the apparatus may provide geographical location information within 25 centimeters using differential GPS. The information provided by the GPS is available to other applications on the apparatus that provide functions for mapping or giving directions to investigators or other personnel involved in an incident.

Referring to FIG. 7, another hardware environment for identification and verification is shown 700 according to the present invention. The present invention may be implemented using a identification and verification processor 730, comprised of a processor 710 and memory (RAM) 740. It is envisioned that attached to the identification and verification processor 730 may be a memory device 740. Also included in this embodiment may be input devices 750, sensors to detect and input the desired image/data and interface to the user for downloading data and commands.

The identification and verification processor 730 may operate under the control of an operating system. The identification and verification processor 730 executes one or more computer programs under the control of the operating system.

Generally, the operating system and the circuit programs may be tangibly embodied in a computer-readable medium or carrier, e.g. one or more of the fixed or removable data storage devices 720, or other data storage or data communications devices. A quantizer 770 may be used for conversion or the analog signals to digital between the identification and verification processor 730 and any connecting digital device. Both operating system and the computer programs may be loaded from the data storage devices into the memory 740 of the identification and verification processor 730 for execution by the processor 710. Those skilled in the art will recognize that the memory 740 is optional, or may be a memory device embedded or otherwise couple to the identification and verification processor 730. Both the operating system and the generator programs comprise instructions which, when read and executed by the processor 710, cause the identification and verification processor 730 to perform the steps necessary to execute the steps or elements of the present invention. The resulting digital output 760 is produced.

Although one service request system configuration is illustrated in FIG. 7, those skilled in the art will recognize that any number of different configurations performing similar functions may be used in accordance with the present invention.

The above specification, examples and data provide a complete description of the manufacture and use of the composition of the invention. Since many embodiments of the invention may be made without departing from the spirit and scope of the invention, the invention resides in the claims hereinafter appended.

What is claimed:

1. A method of real-time identification and verification of the identity of a person comprising the following steps:

capturing an image of a fingerprint of the person at a portable handheld device, said device comprising a housing including a handle portion having a distal end and a proximal end and a user interface portion at the distal end of the handle portion, while the handle portion of the portable handheld device is grasped by a single hand of an operator of the portable handheld device and the apparatus is operated via the user interface during image capture of the fingerprint;

processing the captured fingerprint image at the portable handheld device to determine if the fingerprint image meets a predetermined quality level;

storing fingerprint images that satisfy the predetermined fingerprint quality level in temporary data storage of the portable handheld device;

enhancing the fingerprint image at the portable handheld device;

after enhancing the fingerprint image, transmitting fingerprint images that satisfy the predetermined fingerprint quality level to a central processor for processing;

processing the transmitted fingerprint images to determine if there is matching fingerprint information in central data storage;

receiving data from the central processor relating to the processed fingerprint images at the portable handheld device; and displaying the data received on a display of the portable handheld device.

2. The method of claim 1, wherein the step of capturing a fingerprint image includes the steps of:

positioning the finger on a finger receiving surface of the portable handheld device; and scanning a slap imprint of the finger.

3. The method of claim 2, wherein the finger receiving surface captures fingerprint images in varying illumination conditions ranging from bright sunlight to total darkness.

4. The method of claim 2, wherein the step of capturing a fingerprint image includes the steps of:

positioning the finger on a finger receiving surface of the portable handheld device; and scanning a rolled fingerprint.

5. The method of claim 1, wherein the step of capturing a fingerprint image comprises scanning a latent imprint.

6. The method of claim 1, wherein the step of capturing a fingerprint image includes the step of determining the image quality of the fingerprint image captured.

7. The method of claim 1, wherein the step of transmitting fingerprint images includes the steps of:

a wireless transmission from the portable handheld device to a wireless mobile unit for processing; and wireless transmission from the wireless mobile unit to the central processor for comparison of the fingerprint images transmitted to a plurality of previously stored images to determine identity and background of the person.

8. The method of claim 1, further including the step of capturing a facial image and transmitting the captured facial image to a central processor, wherein the step of transmitting the facial image to the central processor includes the steps of:

a wireless transmission from the portable handheld device to a wireless mobile unit for processing; and wireless transmission from the wireless mobile unit to the central processor for comparison of the facial image transmitted to a plurality of previously stored facial images to determine identity and background information of the person.

9. The method of claim 1 further including the steps of recording, displaying, and transmitting live video images captured, wherein the step of transmitting the live video images captured includes the steps of:

a wireless transmission of the live video images captured from the portable handheld device to a wireless mobile unit for processing; and wireless transmission of the live video images captured from the wireless mobile unit to the central processor for storage in central data storage.

10. The method of claim 1 further including the steps of recording, playing back, displaying, analyzing, and transmitting audio information captured, wherein the step of transmitting the audio information captured includes the steps of:

a wireless transmission of the audio information captured from the portable handheld device to a wireless mobile unit for processing; and wireless transmission of the audio information from the wireless mobile unit to the central processor for comparison of the audio information transmitted to a plurality of previously stored voice files to determine identity and background information of the person.

11. The method of claim 1 further including the step of capturing identification data from an external source.

12. The method of claim 11 wherein the external source is an identification card having a magnetic strip bar code.

13. The method of claim 11 wherein the external source is a smart card.

14. The method of claim 1 including the step of capturing geographical position and direction data.

15. The method of claim 1 including the step of transmitting a signal for emergency assistance.

16. The method of claim 1, wherein enhancing the fingerprint image comprises at least one of the following steps:

thresholding the image;

enhancing contrast of the image;

enhancing sharpness of the image; and inverting the image.

17. A portable apparatus for identification and verification of a fingerprint comprising:

a housing including a handle portion having a distal end and a proximal end and a user interface portion at the distal end of the handle portion, wherein the handle portion and user interface portion are configured to allow the handle portion to be held by a single hand of an operator and the apparatus operated via the user interface using the same hand during image capture of the fingerprint;

a finger-receiving surface located at the distal end of the handle portion for receiving images of a fingerprint of a subject while the apparatus is being handheld by the operator;

a sensor positioned within the housing for capturing the fingerprint images from the finger-receiving surface;

a processor positioned within the housing and electrically connected to the sensor for processing the fingerprint images captured to determine if the fingerprint images captured meet a minimum fingerprint quality level;

a transmitter positioned within the housing and electrically connected to the processor for transmitting fingerprint images to a central processor for identification and verification; and a module configured to operate within the processor for the enhancement of the fingerprint images prior to transmittal of the fingerprint images.

18. The portable apparatus of claim 17, further including a module within the processor that provides for the capture of the fingerprint images prior to transmittal.

19. The portable apparatus of claim 17, further including data storage electrically connected to the sensor for storing the fingerprint images captured that meet a minimum fingerprint quality level.

20. The portable apparatus of claim 17, including a removable baffle for preventing illumination sources to interfere with capturing the fingerprint images on the finger-receiving surface.

21. The portable apparatus of claim 17 including a recorder for recording and playing back audio and video information.

22. The portable apparatus of claim 17 wherein the user interface includes a card reader for entry of identification data from smart cards or cards having magnetic strips.

23. The portable apparatus of claim 17 wherein the user interface includes a bar code reader for entry of identification data.

24. The portable apparatus of claim 17 including a GPS receiver electrically connected to the processor to provide for the capture of geographical position and direction data.

25. The portable apparatus of claim 17 including a wireless transmitter electrically connected to a single switch and the processor for transmitting a signal for emergency assistance when the single switch is engaged.

26. The portable apparatus of claim 17 wherein the user interface includes a data entry device for entry of text or voice data.

27. The portable apparatus of claim 17 further including a latent fingerprint alignment guide.

28. The portable apparatus of claim 17 wherein the transmitter is a wireless transmitter.

29. A method of real-time identification and verification of the identity of a person comprising the following steps:
    capturing a facial image of the person at a portable handheld device, said device comprising a housing including a handle portion having a distal end and a proximal end and a user interface portion at the distal end of the handle portion, while the handle portion of the portable handheld device is being grasped by a single hand of an operator of the portable handheld device and the apparatus is operated via the user interface during capture of the facial image;
    storing the facial image in temporary data storage of the portable handheld device;
    transmitting the facial image to a central processor for processing;
    processing the transmitted facial image to determine if there is matching facial information in central data storage;
    receiving data from the central processor relating to the processed facial image; and
    displaying the data received on a display of the portable handheld device.

30. The method of claim 29 wherein the step of capturing a facial image may be performed in varying illumination conditions ranging from intense illumination to total darkness.

31. A method of real-time identification and verification of the identity of a person comprising the following steps:
    capturing an image of a fingerprint of the person at a portable handheld device, said device comprising a housing including a handle portion having a distal end and a proximal end and a user interface portion at the distal end of the handle portion, while the handle portion of the portable handheld device is grasped by a single hand of an operator of the portable handheld device and the apparatus is operated via the user interface during image capture of the fingerprint;
    storing the fingerprint image in data storage of the portable handheld device;
    transmitting the fingerprint image to a central processor for processing;
    processing the transmitted fingerprint image to determine if there is matching fingerprint information in central data storage;
    receiving data from the central processor relating to the processed fingerprint image at the portable handheld device; and
    displaying the data received on a display of the portable handheld device.

32. The method of claim 31, wherein the finger receiving surface captures a fingerprint image in varying illumination conditions ranging from bright sunlight to total darkness.

33. The method of claim 31, wherein the step of capturing a fingerprint image includes at least one of the steps of: positioning a finger on a finger receiving surface and scanning a rolled fingerprint or scanning a slap imprint of the finger.

34. The method of claim 31 further including the step of capturing a facial image and wireless transmitting the captured facial image from the portable handheld device to a central processor.

35. The method of claim 31 wherein the step of capturing a fingerprint comprises scanning a latent imprint using a photo capture sensor of the portable handheld device.

36. A portable apparatus for identification and verification of a fingerprint comprising:
    a housing including a handle portion having a distal end and a proximal end and a user interface portion at the distal end of the handle portion, wherein the handle portion and user interface portion are configured to allow the handle portion to be held by a single hand of an operator and the apparatus operated via the user interface using the same hand during image capture of the fingerprint;
    the user interface including at least a display and a finger-receiving surface to receive an image of a fingerprint of a subject while the apparatus is held by the operator of the portable handheld device;
    a sensor positioned within the housing to capture a fingerprint image from the finger-receiving surface;
    a processor positioned within the housing and electrically connected to the sensor to process the captured fingerprint image;
    a transmitter positioned within the housing and electrically connected to the processor to transmit a fingerprint image to a central processor for identification and verification; and
    wherein the processor is configured to receive data from the central processor relating to the processed fingerprint image and the display is configured to display the data to the operator.

37. The portable apparatus of claim 36 further including a removable light baffle for preventing illumination sources to interfere with capturing the fingerprint image on the finger-receiving surface.

38. The portable apparatus of claim 37 wherein the baffle is arranged and configured to align a fingerprint with the finger receiving surface such that fingerprint characteristics are properly located relative to the sensor.

39. The portable apparatus of claim 36 further including an ergonomic handle formed on the housing that provides for one hand operation and command of all the functions of the apparatus.

40. The portable apparatus of claim 36 further including a photo capture sensor to capture a facial image of the subject and a latent fingerprint alignment guide configured and arranged with respect to the photo capture sensor to obtain latent fingerprint images.

41. The portable apparatus of claim 40 wherein the alignment guide is removable.

42. A portable apparatus for identification and verification of a fingerprint comprising:
 a housing including a handle portion having a distal end and a proximal end and a user interface portion at the distal end of the handle portion, wherein the handle portion and user interface portion are configured to allow the handle portion to be held by a single hand of an operator and the apparatus operated via the user interface using the same hand during image capture of the fingerprint;
 the user interface for the housing including at least a display;
 a photo capture sensor and a latent fingerprint alignment guide configured and arranged with respect to the photo capture sensor to capture a latent fingerprint image of a subject while the apparatus is held by the operator of the apparatus;
 a processor positioned within the housing and electrically connected to the photo capture sensor to process a latent fingerprint image;
 a transmitter positioned within the housing and electrically connected to the processor to transmit a latent fingerprint image to a central processor for identification and verification; and
 wherein the processor is configured to receive data from the central processor relating to the processed latent fingerprint image and the display is configured to display the data to the operator.

43. The portable apparatus of claim 42 further including:
 a finger-receiving surface to receive an image of a fingerprint and a sensor positioned within the housing to capture a fingerprint image from the finger-receiving surface; and
 wherein the processor is configured to process a captured fingerprint image and receive data from the central processor relating to the captured fingerprint image and the display is configured to display this data to the operator.

44. A method of real-time identification and verification of the identity of a person comprising the following steps:
 capturing an image of a fingerprint of the person at a portable handheld system, said system comprising a housing including a handle portion having a distal end and a proximal end and a user interface portion at the distal end of the handle portion, while the handle portion of the portable handheld system is grasped by a single hand of an operator of the portable handheld system and the apparatus is operated via the user interface during image capture of the fingerprint;
 processing the captured fingerprint image at the portable handheld system;
 transmitting the captured fingerprint image from the portable handheld system to a central processor for processing;
 processing the transmitted captured fingerprint image to determine if there is matching fingerprint information in central data storage;
 receiving data from the central processor relating to a processed fingerprint image; and
 displaying the data received on a display of the portable handheld system.

45. The method of claim 44 wherein the data includes a facial image.

46. A portable system for identification and verification of a fingerprint comprising:
 a housing including a handle portion having a distal end and a proximal end and a user interface portion at the distal end of the handle portion, wherein the handle portion and user interface portion are configured to allow the handle portion to be held by a single hand of an operator and the apparatus operated via the user interface using the same hand during image capture of the fingerprint;
 the user interface including at least a display and a finger-receiving surface to receive an image of a fingerprint of a subject;
 a sensor positioned within the housing to capture fingerprint image from the finger-receiving surface;
 a processor electrically connected to the sensor to process the captured fingerprint image;
 a transmitter electrically connected to the processor to transmit an image to a central processor for identification and verification; and
 wherein the processor is configured to receive data from the central processor relating to the processed image and the display is configured to display the data to the operator.

47. A portable system for identification and verification of a fingerprint comprising:
 a handle portion of a housing having a distal end and a proximal end, said handle portion configured to be grasped by a single hand of an operator to thereby support the housing during imaging of a fingerprint of a subject;
 a user interface of the housing, the user interface at the distal end of the handle portion and including at least a finger-receiving surface to receive an image of the fingerprint of the subject and buttons for operator data entry and execution, wherein the user interface is configured to be operated by the same hand of the operator via the buttons while the housing is being handheld by the operator during capture of the fingerprint image;
 a sensor in the housing positioned to capture the fingerprint image from the finger-receiving surface;
 a transmitter in the housing to transmit the captured fingerprint image to a central site for identification and verification;
 a processor configured to receive data from the central site relating to the processed image; and
 a display configured to display the data to the operator.

* * * * *